United States Patent
Ngo et al.

(10) Patent No.: US 7,603,909 B2
(45) Date of Patent: Oct. 20, 2009

(54) PIEZOELECTRIC POLYMER SENSOR DEVICE

(75) Inventors: Kiet Ngo, London (CA); Paul Hogendoorn, London (CA); Michael Reeve, London (CA)

(73) Assignee: OES, Inc., London, Ontario (CA)

( * ) Notice: Subject to any disclaimer, the term of this patent is extended or adjusted under 35 U.S.C. 154(b) by 0 days.

(21) Appl. No.: 11/759,430

(22) Filed: Jun. 7, 2007

(65) Prior Publication Data

US 2008/0078255 A1   Apr. 3, 2008

Related U.S. Application Data

(60) Provisional application No. 60/849,068, filed on Oct. 3, 2006.

(51) Int. Cl.
*G01B 7/16* (2006.01)
(52) U.S. Cl. .......................................... 73/777; 73/760
(58) Field of Classification Search .................. 73/777, 73/760
See application file for complete search history.

(56) References Cited

U.S. PATENT DOCUMENTS

| | | | |
|---|---|---|---|
| 3,948,089 A * | 4/1976 | Shaw et al. ..................... 73/776 |
| 4,745,378 A * | 5/1988 | Niitsuma et al. ............. 333/196 |
| 5,271,254 A | 12/1993 | Gloe et al. |
| 5,444,191 A * | 8/1995 | Yamamoto et al. ....... 178/18.01 |
| 6,144,834 A * | 11/2000 | Thayer ........................ 399/352 |
| 6,212,924 B1 | 4/2001 | Meisser |
| 6,517,497 B2 * | 2/2003 | Rymut et al. ................ 600/538 |
| 6,936,837 B2 * | 8/2005 | Yamada et al. .................. 257/2 |
| 7,024,752 B2 | 4/2006 | Imgrut et al. |
| 2007/0200692 A1* | 8/2007 | Kamel et al. ................. 340/436 |

OTHER PUBLICATIONS

PCT International Search Report and Written Opinion of the International Searching Authority for International Application No. PCT/CA2007/001120, mailed Sep. 28, 2007.
PCT International Preliminary Report on Patentability for International Application No. PCT/CA2007/001120, mailed Apr. 16, 2009.

* cited by examiner

*Primary Examiner*—Max Noori
(74) *Attorney, Agent, or Firm*—Carlson, Gaskey & Olds PC

(57) ABSTRACT

A sensor device includes at least one piezoelectric polymer film supported on a plate that is positioned relative to a machine such that a force used during a manufacturing process involving the machine is incident on the plate. The piezoelectric polymer film provides an electrical output indicative of the incident force. In a disclosed example, a single piezoelectric polymer film extends across a substantial portion of a surface area of the plate. In another disclosed example, a plurality of piezoelectric polymer film sensor elements area are arranged symmetrically about a location where the incident force is expected to be most prominent.

20 Claims, 2 Drawing Sheets

PIEZOELECTRIC POLYMER SENSOR DEVICE

CROSS REFERENCE TO RELATED APPLICATIONS

This application claims priority to U.S. Provisional Application No. 60/849,068 which was filed on Oct. 3, 2006.

TECHNICAL FIELD

This invention relates to force sensing during a manufacturing or part forming process. More particularly, this invention relates to a piezoelectric polymer sensing device for monitoring such forces.

DESCRIPTION OF THE RELATED ART

Modem automobiles are heavily dependent on the electrically powered devices and electronics incorporated into every car. The wire harness is an integral part of almost every automotive system feature and function, comprising hundreds of wires or "circuits" that interconnect all of these systems that include sensors, safety systems, computers, engine and emission, entertainment, etc. The wire harnesses have become increasingly complex with the additional safety systems, features, and options which has also increased the number of wires or circuits to interconnect these different devices. Each circuit is a length of a specific size, color, and type of wire and insulation coating that has a terminal applied or "crimped" to each end. The terminal is then assembled into a multi-circuit connector which is connected (e.g., plugged into) the corresponding device connector in the vehicle.

Wire harnesses are manufactured in high volume assembly operations. The quality of the wire harness assembly process is critical with respect to ensuring 100% quality with zero defects. For many years, visual inspection was used to check quality. Wire harness manufacturing facilities have adopted crimp force monitor systems to ensure the quality of the crimping process for automated and manual assembly operations. Crimp force monitors are widely deployed and in most cases mandated for automotive wire processing assembly applications. The crimp force monitor (CFM) monitors the force during the wire crimping with the insulation removed.

CFMs utilize signature analysis to detect a wide range of characteristic process variations which are correlated to crimp defects including missing wire strands, high insulation, twisted terminal, etc. CFM technology is well known and has changed over the years with various software algorithms and signature analysis refinements that have improved the performance of these systems.

There have been different sensor options. For example ceramic and quartz crystal piezoelectric force sensor rings are the typical sensors deployed for crimp monitoring. These sensors are installed in the upper part of the press above the tooling or in the base plate under the crimp tooling. Recently, piezo strain sensors have been introduced that are attached to the frame of the press with equivalent capability as force rings for detecting crimp defects relative to micro strain deflection of the press frame. These piezoelectric strain sensors have proven to be quite effective, offering some significant advantages relative to the force rings. For example the strain sensor offers simple mechanical integration with minimum modifications to the press, and low maintenance, while providing an equivalent performance result as the force rings.

The automotive industry has become very confident and dependent on the reliability and performance of crimp force monitors on their wire production machines for assurance of quality. The high increase in circuits within the automobile has resulted in a very large diameter wire harness with significant increase to the harness weight. The weight and size of the wire harness is now being reduced by changing from 16-22 gauge wire, for example, to lighter gauge wire (e.g., 26-30 gauge) with a thin wall insulation. Wire harness manufacturing plants are re-tooling the production facilities for processing this small diameter wire.

This change in wire size has exposed limitations for existing monitoring techniques. Visual inspection is no longer adequate. Additionally, traditional CFMs have limitations that render them insufficient for many situations. Traditional CFMs have characteristically lower performance and inherent sensing deficiencies for lighter gauge crimping applications. There are a number of reasons for this which are associated with the sensing methodology. These inherent performance limitations are more evident for lighter gauge crimping applications and render the existing CFMs inadequate to handle lighter gauge wire crimping sensing requirements.

For example, existing CFMs have a relatively low output signal compared to an experienced force. With lighter gauge wires, lighter crimping forces are employed. It follows that existing CFMs will have an even lower output signal. This becomes problematic because the signal to noise ratio is very low and, in some cases, the signal is not easily distinguished from the noise.

Additionally, the shunting effect associated with known CFM arrangements is even is more significant. The shunting effect occurs when the crimp force bypasses around the force sensor, which reduces sensitivity, repeatability or both. Shunting results if the sensor is not aligned with the work, or oil or scrap builds up under the applicator tool, or if there are bent tools or components.

When traditional piezo force ring sensors are used, performance is dependent on mechanical alignment, surface preparation, and parallel surfaces for an optimum output that correlates to the force during the crimping application. The force ring mounting surfaces must be parallel and the forces must be transferred at 90 degrees to the surface of the force sensor. This becomes very critical for light gauge crimping applications. Typical mounting, however, can result in non parallel surfaces. Edge loading of the force sensor will result in a sensor output cancellation and reduced sensitivity that is especially critical when working with lighter gauge wires.

One other drawback associated with traditional CFMs is that the sensor has an operating range that is very broad. A wider operational range reduces sensitivity, especially at lower force levels given the relatively low output signal from a typical CFM. The typical sensor mechanical operating range is 5000 lb. This is usually for matching the press operational range which is typically 2 tons. Light gauge terminal crimping can include forces as low as 60-100 lb. Such an operation utilizes only 2% of the typical CFM full scale range. Sensors with a single range intended to function for specific, previous applications have limited resolution for more recently intended light gauge crimping applications.

SUMMARY

A disclosed example sensor device includes a plate adapted to be associated with a forming machine such that a force used during a forming operation is incident on the plate. At least one piezoelectric polymer film is supported on the plate. The film provides an electrical output indicative of the force incident on the plate.

One example includes a plurality of piezoelectric polymer films supported on the plate. In one such example, the films are arranged symmetrically about a location on the plate that is expected to be where the incident force is most prominent.

In another example, the at least one piezoelectric polymer film has outside dimensions that correspond to at least a substantial portion of a surface area of the plate.

The various features and advantages of this invention will become apparent to those skilled in the art from the following detailed description. The drawings that accompany the detailed description can be briefly described as follows.

DETAILED DESCRIPTION

Disclosed example embodiments of a sensor device use piezoelectric polymer film sensor technology supported on a plate that experiences a force applied by an associated part forming machine. The disclosed examples ensure that the compression forces that occur during the part forming (e.g., wire crimping) are in series with the sensor device, minimizing any shunting effect and eliminating edge loading condition characteristics associated with traditional sensing arrangements. Additionally, the disclosed examples provide for boosting an output signal level per unit of measured force.

Figure 1:
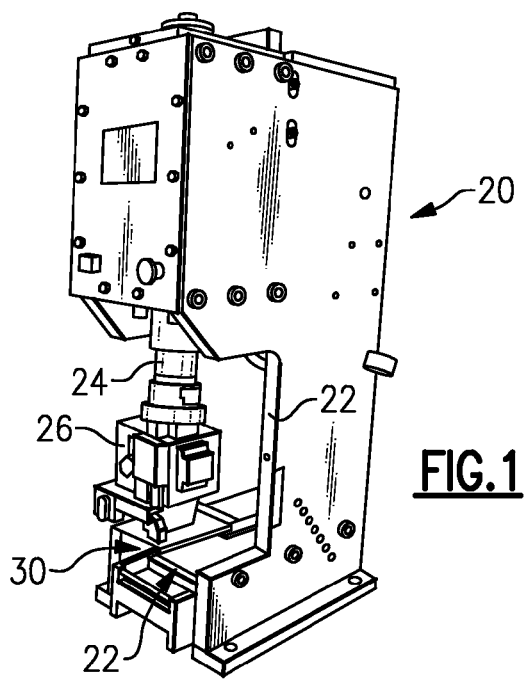
FIG. 1 schematically shows an example machine incorporating an example sensor device designed according to an embodiment of this invention.

FIG. 1 schematically shows an example machine 20 that is used for a manufacturing or part forming process. The machine 20 includes a machine frame 22. A ram 24 moves relative to the frame 22 for generating a force used for a part forming process. Applicator tooling 26 operates in a known manner to perform a desired part formation process. A sensor device 30 is associated with the machine 20 for providing an indication of the forces occurring during a part forming process so that the quality of at least one of the resulting part, the process used to make the part or the applicator tooling can be determined.

Figure 3:
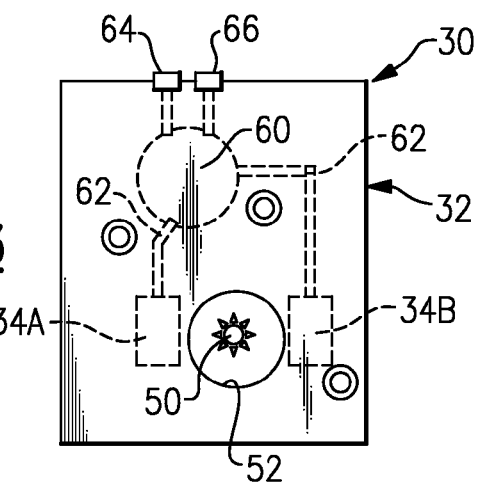
FIG. 3 illustrates the arrangement of FIG. 2 from another perspective.
Figure 2:
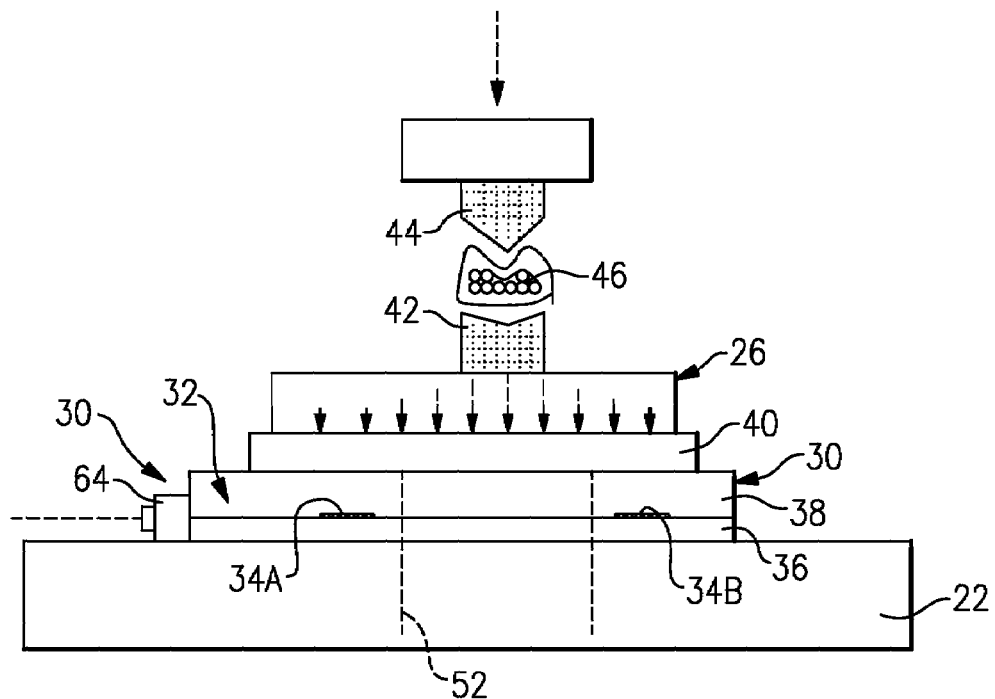
FIG. 2 schematically illustrates one example arrangement.

Referring to FIGS. 2 and 3, one example sensor device 30 is shown associated with selected portions of a machine that is used for a wire crimping process. Crimping wire terminals is a known process that is used for many manufacturing or assembly processes for various purposes. One example purpose for wire crimping processes are for preparing wire harnesses for use in an automobile.

The example sensor device 30 includes a plate 32 that supports at least one piezoelectric polymer film 34. One example piezoelectric polymer film comprises polyvinylidene difluoride (PVDF). In the example of FIGS. 2 and 3, two separate piezoelectric polymer film elements 34A and 34B are supported on the plate 32. In the illustrated example, the plate 32 comprises a first plate portion 36 and a second plate portion 38.

The piezoelectric polymer film elements 34A and 34B are sandwiched between the plate portions 36 and 38 in this example. In examples where each of the plate portions 36 and 38 are electrically conductive, the polymer film 34 is used to isolate them from each other to avoid shorting out the positive and negative sides of the polymer film. In some examples, the piezoelectric polymer film has an electrically negative side and an oppositely facing, electrically positive side. Isolating metal plate portions avoids the plates shorting out the film, which would otherwise happen if the metal plate portions contact each other and contact the positive and negative sides of the film, respectively. In one example, two piezoelectric polymer films are placed adjacent each other with the positive sides of the films facing each other. In such an example, the metal plate portions only contact the outwardly facing negative sides of the films so that there is no concern with shorting out the films.

The piezoelectric polymer film elements 34A and 34B provide an electrical output that is indicative of a force incident on the plate 32 during a part forming process. As can be appreciated from FIG. 2, the example plate 32 is positioned between an applicator tool base 40 and a plate of the machine frame 22. Forces involved in the operation of crimping portions 42 and 44 of the applicator tooling 26 while establishing a wire crimp schematically shown at 46 are incident on the plate 32. The piezoelectric polymer film elements 34A and 34B provide an electrical output that is indicative of such forces.

In one example, the outputs from the piezoelectric polymer film elements 34A and 34B are summed using suitable electronics or software configured for such signal processing to provide a higher output value per unit of detected force compared to that from either element, alone. The summing also avoids any cancellation effects if there is an offset or misaligned incident force.

As can best be appreciated from FIG. 3, the forces associated with the part forming process will be concentrated at a location 50. In the illustrated example, this location is aligned with a scrap shoot 52, which comprises an opening through the plate 32 and corresponding portion of the frame 22. The piezoelectric polymer film elements 34A and 34B are arranged symmetrically about the location 50 where the part forming force is expected to be most prominent (e.g., concentrated or centered). The symmetric arrangement of the piezoelectric polymer film elements 34A and 34B eliminates any shunting of the forces detected by the sensor device 30. Such an arrangement improves sensitivity, the signal-to-noise ratio and repeatability.

The illustrated arrangement also eliminates any need for a mounting bolt as was required with previous crimp force monitors that relied on sensor rings. Such a mounting bolt has the drawback that it can shunt a portion of an applied force in a traditional sensor, which introduces inaccuracies. Using a piezoelectric polymer film as schematically shown, therefore, provides an improved sensor device.

With at least one piezoelectric polymer film sensing element between the plate portions 36 and 38, the complete surface of the plate 32 becomes a sensing surface. The surface of the plate 32 is essentially a sensing table or platform. This arrangement ensures that compression forces that occur during a part forming process are completely in series with the sensing elements. This minimizes any shunting effect and eliminates edge loading conditions.

Traditional single axis crystal or ceramic sensors cannot correct for directionality of loading because they are designed to measure forces applied in an axial direction. If one side of a force ring is loaded higher than the other side (e.g., in the case of edge loading with a bending moment), the resulting generated charge distributes evenly about the top and bottom electrodes with a cancellation effect. The overall effect is that a single force ring sensor offset to one side cannot distinguish finer process variation (e.g., slight rocking of an applicator tool) from actual failure when a small gauge terminal is being used in the forming process. The illustrated example of FIGS. 2 and 3, on the other hand, is not affected by edge loading and there is no such output cancellation condition. Accordingly, the illustrated example provides improved measurement accuracy and repeatability.

Additionally, it boosts the output signal per unit of input force. The inherent properties of a piezoelectric polymer such as PVDF provide improved signal-to-noise ratios when compared to conventional piezoelectric crystals (e.g., quartz) and piezoelectric ceramics (e.g., PZT). In a simple compressive mode, a piezoelectric material voltage output in response to an applied force is governed by the piezo stress constant ($g_{31}$). PZT, for example, typically has a $g_{31}=10\times10^{-3}$ Vm/N while a piezoelectric polymer has a $g_{31}=216\times10^{-3}$ Vm/N. Accordingly, a piezoelectric polymer film arrangement as schematically shown in FIGS. 2 and 3 can generate more than 20 times the voltage signal for a given level of load compared to conventional piezoelectric crystals or ceramics.

The example arrangement provides improved robustness and reliability by design because the piezoelectric polymer film sensor elements 34A and 34B are mechanically integrated into the plate 32. In the illustrated example, the sensor film elements are sealed between the plate portions 36 and 38. In one sense, the piezoelectric polymer film sensor elements 34A and 34B can be considered a gasket sandwiched between the first plate portion 36 and the second plate portion 38. This example eliminates any requirement for maintaining an air gap of the kind that previously has been required to isolate a force ring.

As shown in FIG. 3, the plate 32 supports a signal processor 60, which in this example comprises electronics, that process signals provided by the piezoelectric polymer film sensing elements 34A and 34B. Electrical connections between the elements 34A and 34B and the electronics 60 are schematically shown at 62. Including microcontroller technology on the plate 32 allows for sensor power control and signal conditioning at the location of the sensing elements. Additionally, high speed data collection at that location allows for providing a digital output from the sensor device 30 that is available directly from the location of the plate 32.

Such an arrangement provides several advantages. First, the power for the sensor device is regulated at the sensor. High speed data capture local to the sensing elements eliminates the effect of noise introduced by any cables between the plate 32 and another data processing element. The piezoelectric polymer sensor output is converted from analog to digital format local to the sensing elements and exported to another device such as a computer in a convenient manner, for example, using an industry standard compliant communication interface. Such an arrangement allows for providing signature analysis software algorithms in such a computer and does not require it to be part of crimp force monitor hardware. One advantage to such an arrangement is that the signature analysis software may be on one machine that receives information from a variety of sensor devices rather than requiring such software on each of the sensor devices.

In one example, the electronics 60 include a microprocessor that is programmed to analyze the signal signature from the piezoelectric polymer film sensing element or elements and to provide an indication of the corresponding part or process quality based on the analyzed signal signature. In such an example, the capability of providing a quality indication directly from the plate assembly eliminates any need to transmit large amounts of data from the sensor device. It allows for processing the output pass and fail decision internal to the sensor rather than having to provide signal signature information to a remotely located device. This allows for the process of making a quality determination to occur much faster.

The example of FIG. 3 includes a first output 64 that is useful for a first range of sensor device outputs associated with a first range of expected forces and a second output 66 that is useful for a second range of sensor device outputs associated with a second range of forces. In one example, the output 64 is used for high range force part forming processes and the output 66 is used in the case of a relatively lower force range for completing the part forming process.

For example, a low force is associated with small gauge wire crimping applications. In one example, a 90 kilogram peak force is associated with some smaller gauge wire crimping applications. The illustrated example allows for selecting the lower range output (e.g., 66). The electronics 60 have a calibration range scaled according to the selected output. In the case of a 90 kilogram peak force, the output 66 may have a calibration range scaled from 0 to 450 kilogram peak force. A calibration range for the output 64 may be like the typical calibration range of up to 2250 kilogram peak force, which is useful for example with standard wire gauge crimping applications that have a 650 kilogram expected peak force. Providing different calibration ranges for the different outputs 66 and 64 allows the example sensor device to effectively scale the output for various types of part forming processes including a wider variety of wire gauges used in crimping applications, for example. Additionally, providing multiple outputs 64 and 66 and correspondingly different calibration ranges allows for optimum flexibility when using the sensor device 30 and allows for quick changeover in a manufacturing environment when different part forming processes are carried out using the same machinery.

The multiple ranges for the outputs provide an output relative to force with sufficient amplitude to minimize the effect of induced noise associated with any cables used to connect the sensor device 30 to another device such as a computer, which may be several meters away. Using different output ranges in this example improves the signal-to-noise ratio.

One aspect of the outputs 64 and 66 in some examples is that they are configured as industry standard connectors that allow for coaxial cable connections, USB connections, Ethernet connections or serial bus connections, for example. Being able to customize the outputs 64 and 66 in this way allows the example sensor device to be directly connected to a manufacturing machine control system without the need for a separate monitor or analyzing device.

Figure 5:
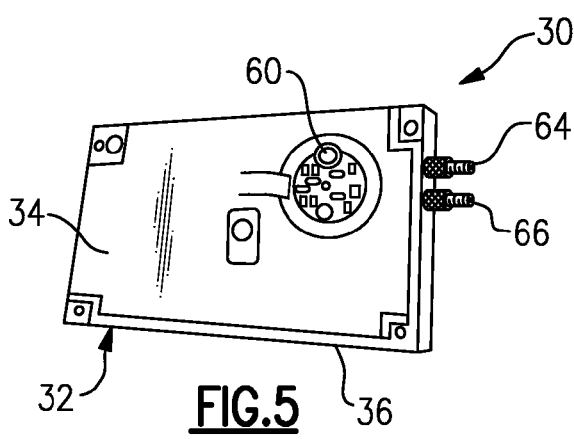
FIG. 5 illustrates the arrangement of FIG. 4 from another perspective.
Figure 4:
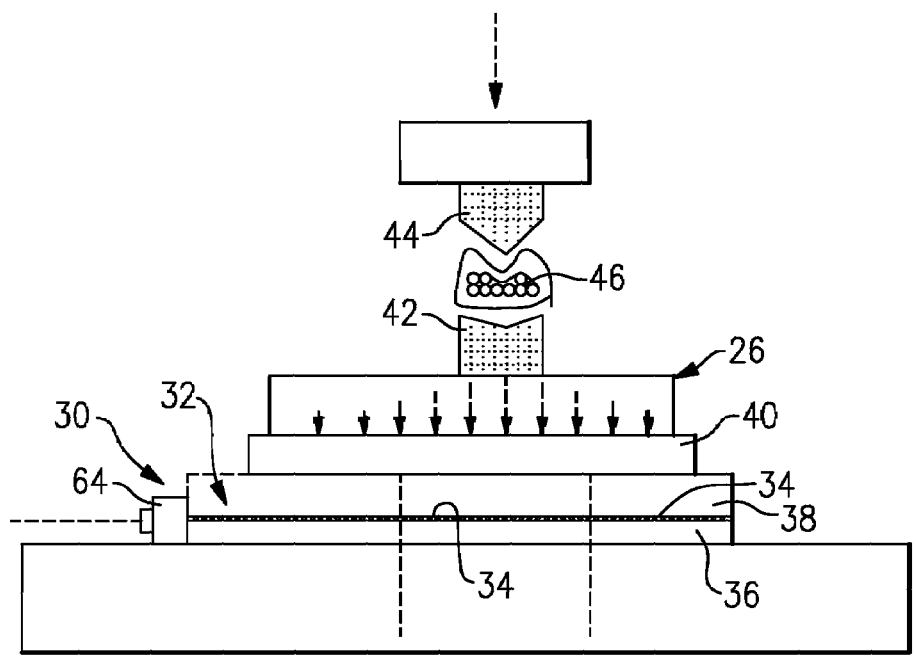
FIG. 4 schematically illustrates another example arrangement.

Another example arrangement is shown in FIGS. 4 and 5. In this example, instead of using individual piezoelectric polymer film sensor elements 34A and 34B, a single piezoelectric polymer film sensing element 34 is arranged between the plate portions 38 and 36. In this example, the plate 32 has a surface area extending between the edges of the plate. The piezoelectric polymer film 34 has outside dimensions (e.g., a surface area) that corresponds to a substantial portion of the surface area of the plate. In one example, the surface area of the piezoelectric polymer film 34 is entirely coextensive with the surface area of the plate 32. In another example, the area of the plate is slightly larger than that of the film 34. Because the film 34 is distributed across a substantial portion of the surface area of the plate, there is no concern with shunting or edge loading effects with this example arrangement. The relationship between the surface areas of the plate and film do not require the film to be on an outside surface of the plate to be "extending across," "corresponding to" or "coextensive with" the surface area of the plate. Instead, those terms are used in this description to describe the desired dimensional relationship. As illustrated, in many embodiments, the piezoelectric polymer film 34 will be sandwiched between plate portions such that it is on the inside of a plate and not on an exposed "surface" of the plate.

Figure 6:
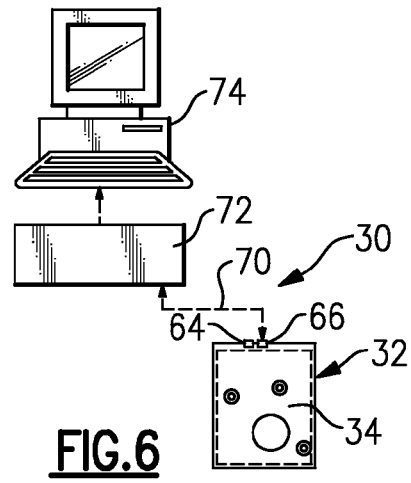
FIG. 6 schematically illustrates another example sensor device arrangement.

In each of the above examples, the electronics 60 for processing signals from the at least one piezoelectric polymer film 34 were supported on the plate 32 of the sensor device 30. The example of FIG. 6 shows another arrangement where the electronics are separate from the plate 32. In this example, a connection 70 includes a coax cable, for example, for connecting a selected one of the outputs 64 or 66 with the processing electronics 72 that are supported separate from the plate 32. The electronics 72 process the signals from the piezoelectric polymer film to provide, for example, a signature indicating the forces associated with a part formation process that is useful for monitoring quality. The electronics 72 communicate with a separate computer device 74 in the illustrated arrangement to provide ongoing or historical quality analysis capabilities, for example.

The ability of the piezoelectric polymer film sensor element 34 or elements 34A and 34B and the ability to provide multiple range sensor outputs yields an output relative to force with sufficient amplitude to minimize the effect of induced noise associated with the connection 70. In some cases, the electronics 72 may be up to three meters away from the plate 32 and a coax cable used for such a connection may tend to introduce noise. Utilizing the approach of this description and a piezoelectric polymer film allows for improving the signal-to-noise ratio, which allows for the example device to be used for a wider range of manufacturing processes.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A sensor device, comprising:
   a base adapted to be associated with a forming machine such that a force used during a forming operation is incident on the base;
   at least one piezoelectric polymer film supported on the base, the film providing an electrical output that provides an indication of the force incident on the base; and
   a signal processor that receives the electrical ouput and provides an output that is an indication of at least one of (i) a quality of a formed part that was formed at least in part by the force incident on the base or (ii) a quality of a part forming process that involved the force incident on the base.

2. The device of claim 1, comprising
   a plurality of piezoelectric polymer films supported on the base.

3. The device of claim 2, wherein
   the plurality of piezoelectric polymer films are arranged symmetrically about a location on the base that is expected to be where the incident force is most prominent.

4. The device of claim 3, wherein
   the base comprises a scrap chute opening and the plurality of films are arranged symmetrically about the scrap chute opening.

5. The device of claim 2, wherein the multiple films provide a combined output indicative of the force incident on the base.

6. The device of claim 5, wherein the combined output comprise a greater output value per unit force relative to an output of one of the films.

7. The device of claim 1, wherein the base has a surface area and the at least one film has outside dimensions that correspond to at least a substantial portion of the surface area.

8. The device of claim 7, wherein the at least one piezoelectric polymer film is a single film.

9. The device of claim 7, wherein the film extends across the entire surface area of the base.

10. The device of claim 1, comprising
    a signal processor supported on the base for converting the output of the at least one film into a digital signal.

11. The device of claim 1, comprising
    a first output portion associated with the base for providing an indication of the output of the at least one film in a first range; and
    a second output portion associated with the base for providing an indication of the output of the at least one film in a second, different range.

12. The device of claim 11, wherein the indication of the first output portion is scaled using a first scaling level and the indication of the second output portion is scaled using a second, different scaling level.

13. The device of claim 12, wherein the first scaling level increases the indication of the first output portion when the first output portion is used to provide an indication of a force in a first range and the second scaling level adjusts the indication of the second output portion when the second output portion is used to provide an indication of a force in a second, higher range.

14. The device of claim 1, comprising
    a second base adjacent the base such that the at least one film is between the base and the second base and the film contacts both of said bases.

15. The device of claim 14, wherein the bases are electrically isolated from each other.

16. The device of claim 15, wherein the film isolates the bases from each other.

17. The device of claim 1, comprising
    a microprocessor at least partially supported by the base, the microprocessor being configured to analyze the output of the film and to provide a corresponding indication of a quality associated with the force.

18. The device of claim 1, wherein the base comprises a plate.

19. The device of claim 1, wherein the indication comprises a measurement of the force.

20. A sensor device, comprising:
    a base adapted to be associated with a forming machine such that a force used during a forming operation is incident on the base;
    at least one piezoelectric polymer film supported on the base, the film providing an electrical output that provides an indication of the force incident on the base
    a first output portion associated with the base for providing an indication of the output of the at least one film in a first range, the indication of the first output portion being scaled using a first scaling level that increases the indication of the first output portion when the first output portion is used to provide an indication of a force in a first range; and
    a second output portion associated with the base for providing an indication of the output of the at least one film in a second, different range, the indication of the second output portion being scaled using a second, different scaling level that adjusts the indication of the second output portion when the second output portion is used to provide an indication of a force in a second, higher range.

* * * * *